United States Patent
Kleinhans et al.

(10) Patent No.: US 6,556,929 B1
(45) Date of Patent: Apr. 29, 2003

(54) DEVICE FOR DETECTING A PULSATING QUANTITY

(75) Inventors: Josef Kleinhans, deceased, late of Vaihingen (DE); by Marie-Luise Beck, Eisingen (DE), heiress and legal representative; by Hildegard Nelson, Eugene, OR (US), heir and legal representative; by Guido Kleinhans, Bad Brueckenau (DE), heir and legal representative; Wolfgang Mueller, Rutesheim (DE); Uwe Konzelmann, Asperg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/787,160

(22) PCT Filed: Jul. 14, 2000

(86) PCT No.: PCT/DE00/02310

§ 371 (c)(1),
(2), (4) Date: May 10, 2001

(87) PCT Pub. No.: WO01/06107

PCT Pub. Date: Jan. 25, 2001

(30) Foreign Application Priority Data

Jul. 17, 1999 (DE) .......................... 199 33 665

(51) Int. Cl.⁷ ............................ G01F 1/00; G01F 7/00; G06F 19/00
(52) U.S. Cl. ........................................ 702/45
(58) Field of Search .................. 702/45; 701/102; 73/118, 2, 115; 123/198, 494; 431/1

(56) References Cited

U.S. PATENT DOCUMENTS

| | | | |
|---|---|---|---|
| 4,946,381 A | * 8/1990 | Saito et al. ................. 431/1 |
| 4,987,877 A | * 1/1991 | Nakaniwa ................. 123/494 |
| 5,031,450 A | * 7/1991 | Nakaniwa et al. ............ 73/115 |
| 5,544,079 A | 8/1996 | Saikalis |
| 5,549,080 A | * 8/1996 | Uchikawa ............... 123/198 D |
| 5,668,313 A | 9/1997 | Tank |
| 5,974,870 A | * 11/1999 | Treinies et al. ............ 73/118.2 |
| 6,115,664 A | * 9/2000 | Cullen et al. ................ 701/102 |

FOREIGN PATENT DOCUMENTS

| | | | |
|---|---|---|---|
| DE | 44 08 243 | 3/1908 | |
| DE | 196 20 435 C | 1/1998 | |
| DE | 199 52 294 A | 9/2000 | |
| EP | 0 902 261 A | 3/1999 | |
| JP | 05248294 A | * 9/1993 | ........... F02D/41/18 |

OTHER PUBLICATIONS

Patent Abstracts of Japan vol. 013, No. 552 (M–903), Dec. 8, 1989 & JP 01 227846 A, Sep. 12, 1989.

* cited by examiner

*Primary Examiner*—John Barlow
*Assistant Examiner*—Aditya Bhat
(74) *Attorney, Agent, or Firm*—Michael J. Striker

(57) ABSTRACT

A device for detecting a pulsating variable, for instance the air flowing in the intake tube of an engine, is disclosed in which the signal processing and the correction of the pulsation error are done in an evaluation device which is a constituent of the sensor. At the output of the signal processor, the sensor, for instance a hot-film air flow rate meter, outputs a corrected output signal, which is directly a measure of the variable to be determined, such as the mass of the air flowing in the intake tube of an internal combustion engine.

9 Claims, 2 Drawing Sheets

DEVICE FOR DETECTING A PULSATING QUANTITY

BACKGROUND OF THE INVENTION

1. Field of the Invention

The invention relates to a device for detecting a pulsating variable and for generating a variable-dependent signal corrected for pulsation error and relates in particular to a device for detecting the pulsating mass, or flow rate, of the air aspirated by an internal combustion engine and for obtaining the mean air mass taken in per segment corrected for pulsation error.

2. Description of the Related Art

For detecting the flow rate of air aspirated by an internal combustion engine, micromechanical air flow rate meters are typically used, whose sensor element is exposed to the flowing air. Since under certain conditions the air mass, or air flow, in the intake tube of the engine is in the form of a pulsating flow in the intake tube, the sensor element is installed for instance not directly in the intake tube but rather in a flow bypass, in which the pulsations are less pronounced. In some engines, such as throttle-free engines, however, the intake tube pulsations are especially strong and cannot be compensated for unless further provisions are made.

There are physical limits to the aerodynamic compensation for pulsation errors. In defining the bypass geometry of the air flow rate meter, the compensation is furthermore limited by the thermal inertia of the sensor. The pulsation error depends on the parameters of the mean air flow rate and the frequency and amplitude of the pulsations. For ranges of parameters in which the bypass geometry cannot compensate for the thermal error of the sensor, in the final analysis incorrect indications remain because of intake tube pulsations. To reduce these incorrect indications, it is proposed for instance in Published, Nonexamined German Patent Application DE-OS 44 08 243 that along with a pneumatic pulsation damping, additional electronic filters are used, which suitably vary or damp the output signal of the sensor element. The electronic filter is a constituent of the sensor and precedes a circuit for characteristic curve adaptation and characteristic curve limitation; this circuit for characteristic curve adaptation and characteristic curve limitation is also a constituent of the sensor element. The electronic filter must be adapted to the expected signal in such a way that both high-frequency natural oscillation and the fundamental oscillation of the pulsation are damped, so that at the output of the filter, the remaining pulsation amplitude is only slight. From the signal thus obtained, mean values of the pulsating variable, that is, mean values of the aspirated air mass, are calculated in a following microcomputer, such as the control unit of an internal combustion engine.

SUMMARY OF THE INVENTION

It is an object of the present invention to provide an improved device for detecting a pulsating variable and for correcting for pulsation of the pulsating variable.

It is a further object of the present invention to provide a device for generating a digital signal characteristic of an amount of air taken into an internal combustion engine from a pulsating airflow during a segment or pulsation period of the engine, which is effectively corrected for pulsation error.

It is another object of the present invention to provide a sensor unit for generating a digital signal characteristic of an amount of air taken into an internal combustion engine that is corrected for pulsation error.

According to the invention the device for generating a corrected signal dependent on an amount of air taken into an internal combustion engine during engine operation, which is corrected for pulsation error due to pulsation of the air taken into the internal combustion engine, includes a sensor element with an analog signal processing means for generating an uncorrected analog signal in cooperation with the sensor element, which varies according to an air flow rate of said air taken into the internal combustion engine;

digitizing means for digitizing the uncorrected analog signal to form an uncorrected digital signal;

analyzer means for determining an amplitude of the uncorrected digital signal;

means for determining a mean value of the uncorrected digital signal;

memory means with at least one pulsation error characteristic curve stored therein, which represents a functional relationship between the pulsation error and sensor signal parameters, which include average air flow rate, pulsation frequency and pulsation amplitude;

means for determining the pulsation error from the at least one pulsation error characteristic curve and at least one of the sensor signal parameters; and means for correcting the mean value of the uncorrected digital signal with the resulting pulsation error.

In a preferred embodiment of the invention the device is a sensor unit including the sensor element so that the mean value is delivered to the control thus relieving the control unit of the necessity of digitizing and correcting the analog signal from the sensor element. Alternatively, the digitizing and analysis of the analog signal from the sensor element can take place in the main control unit of the internal combustion engine.

The device according to the invention for detecting a pulsating variable has the advantage that especially reliable compensation for the pulsation error is obtained, and this can advantageous be adapted to different engines and functions reliably under all possible conditions. In an especially advantageous embodiment the pulsation compensation is already performed in the sensor unit, which relieves a following evaluation device, such as the microprocessor of an engine control unit.

Advantageously, a pulsation error characteristic curve or graph that is taken into account in the compensation is stored in the sensor unit itself. This pulsation error characteristic curve can be ascertained, for instance, at a suitable test bench and can be written into a memory of the sensor unit before the engine is put into operation. The pulsation error characteristic curve PK is a function of various variables; for instance, PK=f (airflow rate, frequency, amplitude). The principle is equally applicable if a corresponding pulsation error performance graph without correction in the HFM is stored in the control unit.

The further advantages of the invention obtained by the provisions recited in the dependent claims. Independently of these advantageous features, there can also be a pulsation error characteristic curve in the following evaluation device, or in other words in the control unit, and further or additional corrective provisions can be performed in the control unit. The invention is advantageously employed for detecting the air flowing from an engine or internal combustion engine through the intake tube, in which a hot-film air flow rate meter is disposed as a sensor in the intake tube.

BRIEF DESCRIPTION OF THE SEVERAL VIEWS OF THE DRAWING

The objects, features and advantages of the invention will now be illustrated in more detail with the aid of the following description of the preferred embodiments, with reference to the accompanying figures in which.

DETAILED DESCRIPTION OF THE INVENTION

Figure 1:
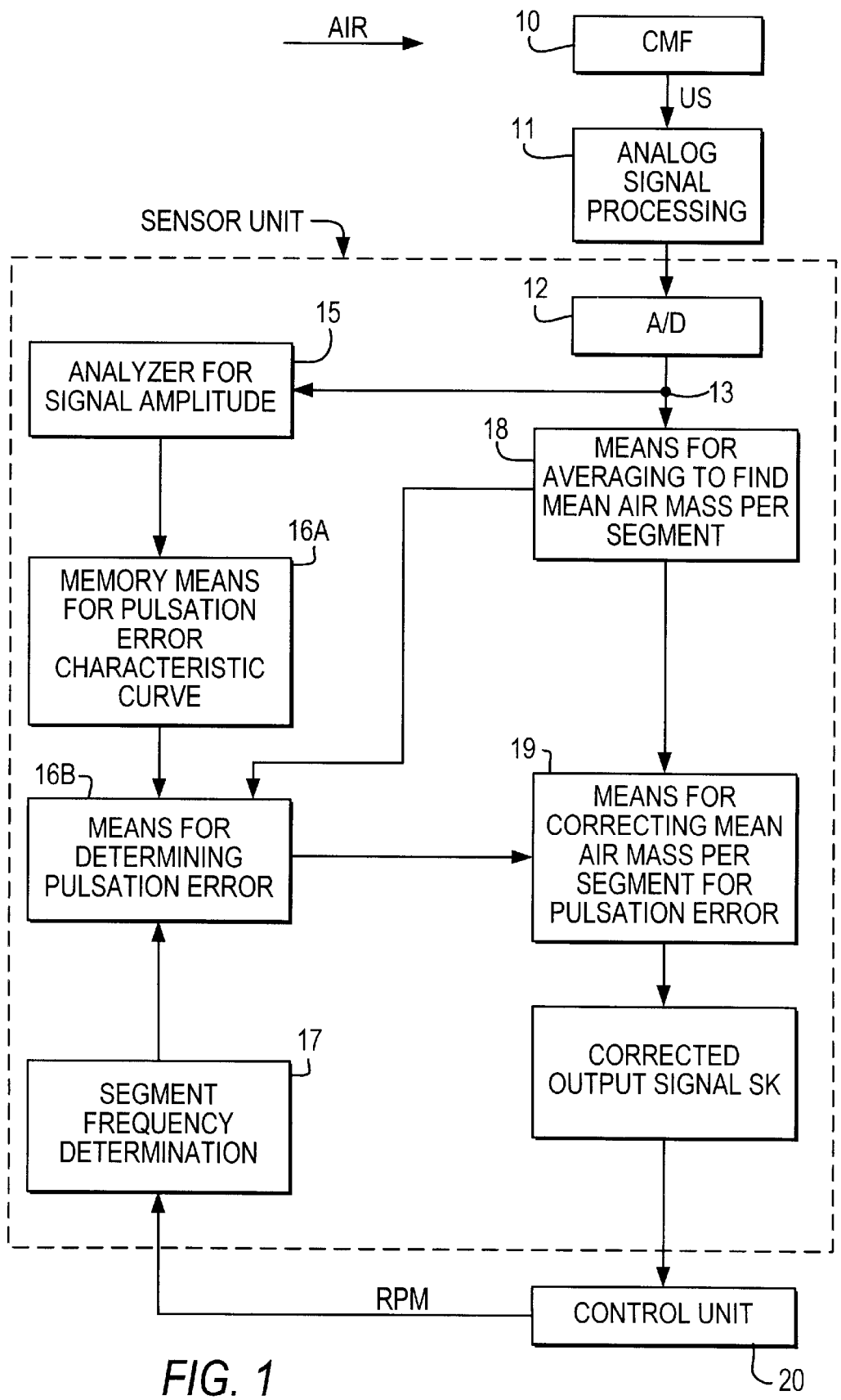
FIG. 1 is a block diagram of a first embodiment of a device according to the invention for generating a digital signal dependent on an amount of air taken into an internal combustion engine, which corrects the digital signal for air flow pulsation errors.

FIG. 1 shows a first exemplary embodiment, in which the mass of the air flowing in the intake tube of an internal combustion engine is to be detected. In general, however, the invention can be applied to all measuring devices with which a pulsating variable is measured.

In the exemplary embodiment shown in FIG. 1, reference numeral 10 indicates the sensor element. This sensor element is a hot-film air flow rate meter, which is located in the intake tube, not shown, of the engine. The sensor unit shown within the dashed lines includes not only the sensor element 10, but also the means for signal processing the electronic signal US from the sensor element, which is to be described in further detail below.

The output signal US of the sensor element 10 is delivered first to an analog signal processor 11. The processed signal from the analog signal processor 11 is digitized in the A/D interface 12 and then delivered to an analyzer 15 at branch point 13. In the analyzer 15, the digital signal is examined to ascertain its amplitude and the mean value of the digital signal is determined in means 18. The pulsation amplitude is determined in analyzer 15, for instance, from the signal maximum or the signal minimum. A further possibility for signal analysis would be a sliding determination of the so-called rms value ("rms" means root means square; standard deviation) of the sensor signal. The pulsation frequency of the signal, which can be used to assist the signal analysis, can be derived from the engine rpm, for instance, or from an item of segment information stored in the control unit 20. The associated evaluation block "segment information frequency" is indicated by reference numeral 17 in the drawing. This information is also delivered to means 16B for determining a pulsation error as well as the information obtained from the analyzer 15 regarding the pulsation amplitude and/or also the mean value from the means 19. A pulsation error characteristic curve is input to the means 16B for determining a pulsation error from the memory means 16A. This pulsation error characteristic curve was determined in a manner explained in more detail below and also in the summary above and previously stored in the memory means 16A.

The term "segment" in an engine means an angular range that extends over two revolutions of the crankshaft, divided by the number of cylinders in the engine. The associated segment information is output from control unit 20 as a control signal, which is required for various calculations that are done in other subsidiary control units. Since the expected frequency of the pulsation of the air in the intake tube is dependent on the engine rpm, or conversely on the length of time that the crankshaft rotates through an angle equivalent to one segment, the pulsation frequency can be determined from the segment information.

Thus the output signal US of the sensor element 10 is followed by a suitable means 15, 16AS, 16B, 18, 19 for electronic correction, which reliably cancels out the pulsation error that occurs in conventional engines. When the pulsation error is known, for instance at full engine load or from test bench measurements, the measurement error can thus be corrected with a pulsation error characteristic curve stored in the sensor unit itself, in which information about the frequency of the intake tube pulsation, its amplitude, and the mean air mass, which is stored in the sensor unit, is evaluated.

Figure 2:
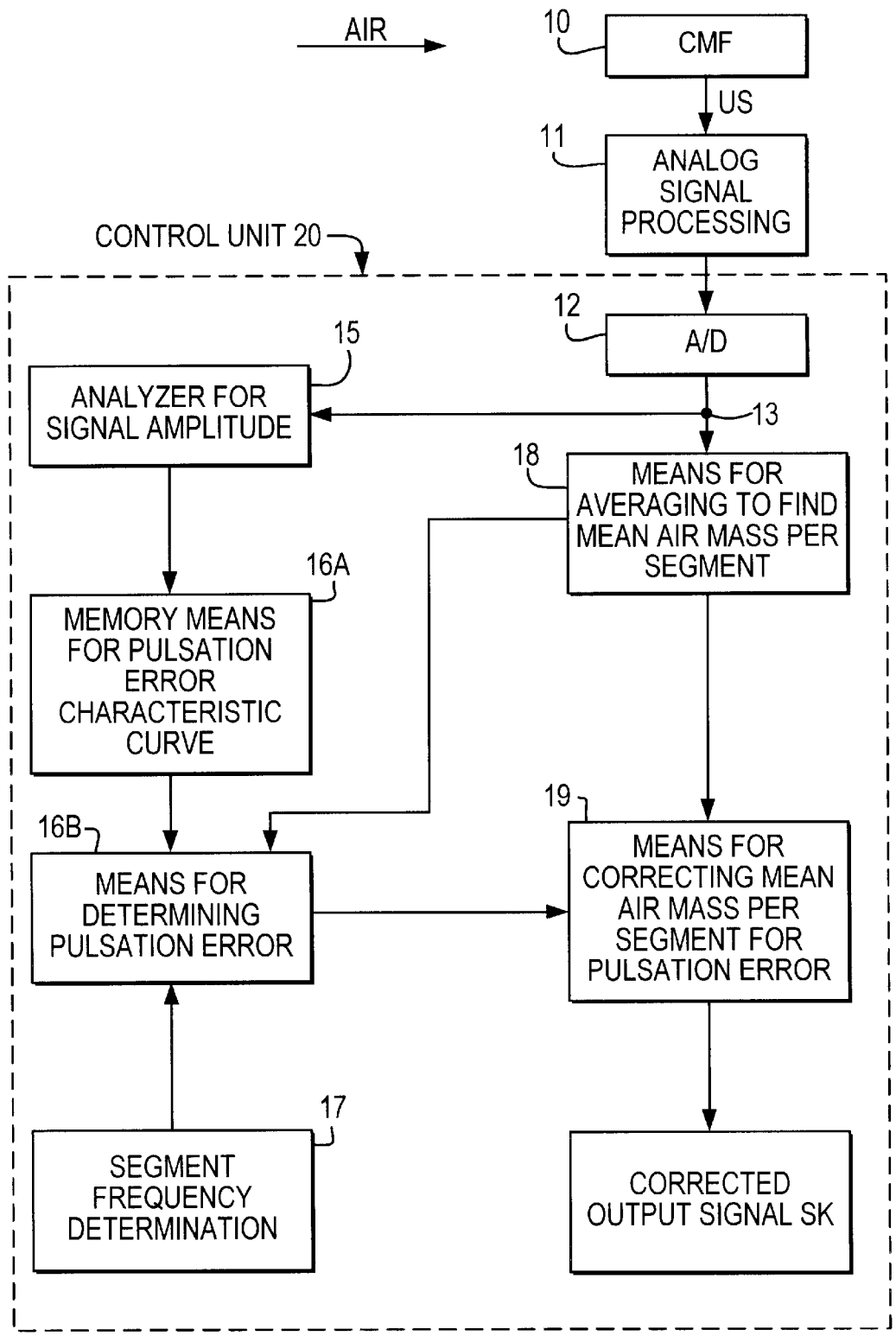
FIG. 2 is a block diagram of a second embodiment of a device for generating a digital signal dependent on an amount of air taken into an internal combustion engine, which corrects the digital signal for air flow pulsation errors.

Alternatively, in an embodiment with a sensor unit without a microprocessor as shown in FIG. 2, the special performance graph or pulsation error characteristic curve can be stored in a memory means 16A of the control unit 20, and the pulsation correction can be done in the control unit 20.

By adding up the sensor signal over one segment, a mean value is obtained in the block captioned "air flow rate segment" 18. This air mass per segment is subjected to an error correction 19, and this error correction is done on the basis of the data taken from the pulsation error characteristic curve 16. After the error correction, a corrected output signal SK is available, which is delivered to the control unit 20. The signal processing described is done in the sensor unit itself in the embodiment of FIG. 1, so that the control unit 20 is already furnished with a corrected signal SK.

The mean air mass is determined from the sensor signal after one pulsation period or one segment. With this information, the appropriate correction is read out from the error performance graph 16, which has been prepared a priori. The air mass, averaged over one pulsation period, is then available, fully evaluated, at the output of the sensor unit in the form of a corrected output signal SK. Since this sensor correction is already available at the next pulsation period, it is immediately possible for a new, corrected value to be made available even in the event of rapid engine load changes.

What is claimed is:

1. A sensor unit for generating a corrected signal dependent on an amount of air taken into an internal combustion engine during engine operation, said corrected signal being corrected for pulsation error due to pulsation of said air flowing into the internal combustion engine, said sensor unit comprising a sensor element (10) with an analog signal processing means (11) for generating an uncorrected analog signal in cooperation with said sensor element (10), said uncorrected analog signal varying according to an air flow rate of said air taken into said internal combustion engine;

digitizing means (12) for digitizing said uncorrected analog signal to form an uncorrected digital signal;

analyzer means (15) for determining an amplitude of said uncorrected digital signal;

means (18) for determining a mean value of said uncorrected digital signal;

memory means (16A) with at least one pulsation error characteristic curve stored therein, said at least one pulsation error characteristic curve representing a functional relationship between said pulsation error and at least one of plural sensor signal parameters, said sensor signal parameters including average air flow rate, pulsation frequency and pulsation amplitude;

means (16B) for determining said pulsation error from said at least one pulsation error characteristic curve and said at least one of said sensor signal parameters;

means (19) for correcting said mean value of said uncorrected digital signal with said pulsation error determined by said means (16B) for determining; and means for delivering a corrected mean value to a control unit (20) of said internal combustion engine.

2. The sensor unit as defined in claim 1, wherein said sensor element (10) comprises a hot-film airflow rate meter.

3. The sensor unit as defined in claim 1, wherein information regarding operating conditions of said internal combustion engine is input from said control unit (20) to said means (16B) for determining said pulsation error.

4. The sensor unit as defined in claim 3, wherein said information regarding said operation conditions includes said engine speed (rpm).

5. The sensor unit as defined in claim 1, wherein said means (18) for determining said mean value of said uncorrected digital signal averages said uncorrected digital signal over a segment of said internal combustion engine during operation of said internal combustion engine.

6. A device for generating a corrected signal dependent on an amount of air taken into an internal combustion engine during engine operation, said corrected signal being corrected for pulsation error due to pulsation of said air flowing into the internal combustion engine, said device comprising a sensor element (10) with an analog means (11) for generating an uncorrected analog signal in cooperation with said sensor element (10), said uncorrected analog signal varying according to an air flow rate of said air taken into said internal combustion engine;

digitizing means (12) for digitizing said uncorrected analog signal to form an uncorrected digital signal;

analyzer means (15) for determining an amplitude of said uncorrected digital signal;

means (18) for determining a mean value of said uncorrected digital signal;

memory means (16A) including said at least one pulsation error characteristic curve stored therein, said at least one pulsation error characteristic curve representing a functional relationship between said pulsation error and at least one of plural sensor signal parameters, said sensor signal parameters comprising average air flow rate, pulsation frequency and pulsation amplitude;

means (16B) for determining said pulsation error from said at least one pulsation error characteristic curve and said at least one of said sensor signal parameters; and means (19) for correcting said mean value of said uncorrected digital signal with said pulsation error determined by said means (16B) for determining;

wherein said analyzer means (15), said means (18) for determining said mean value, said memory means (16A), means (16B) for determining said pulsation error and said means (19) for correcting are accommodated in a control unit of said internal combustion engine.

7. The device as defined in claim 6, wherein said sensor element (10) comprises a hot-film airflow rate meter.

8. The sensor unit as defined in claim 6, wherein said means (18) for determining said mean value of said uncorrected digital signal averages said uncorrected digital signal over a segment of said internal combustion engine during operation of said internal combustion engine.

9. A device for generating a corrected signal dependent on a pulsating variable, said corrected signal being corrected for pulsation error, a sensor element with an analog signal processing means for generating an uncorrected analog signal varying according to a rate of change of the pulsating variable;

digitizing means for digitizing said uncorrected analog signal to form an uncorrected digital signal;

analyzer means for determination of at least one of a mean value and pulsation amplitude of said uncorrected digital signal;

memory means with at least one pulsation error characteristic curve stored therein, said at least one pulsation error characteristic curve representing a functional relationship between said pulsation error and sensor signal parameters, said sensor signal parameters comprising said mean value, pulsation frequency and pulsation amplitude; and means for correcting said mean value of said uncorrected digital signal with said at least one pulsation error characteristic curve stored in said memory means.

\* \* \* \* \*